United States Patent [19]

Lee, II et al.

[11] Patent Number: 5,023,990
[45] Date of Patent: Jun. 18, 1991

[54] DEVICE AND METHOD FOR REMOVABLY RETAINING COMPONENTS IN A SMOOTH BORE

[75] Inventors: Leighton Lee, II, Guilford; Robert J. Kolp, Jr., Ivoryton, both of Conn.

[73] Assignee: The Lee Company, Westbrook, Conn.

[21] Appl. No.: 347,736

[22] Filed: May 5, 1989

[51] Int. Cl.$^5$ .................. F16B 13/06; B23P 11/02
[52] U.S. Cl. ............................. 29/525.1; 411/55; 411/60; 411/271
[58] Field of Search .................. 411/55, 60, 271; 29/525.1

[56] References Cited

U.S. PATENT DOCUMENTS 4,848,971 7/1989 Price, Jr. ............... 411/55 X
4,893,973 1/1990 Herb .......................... 411/55

FOREIGN PATENT DOCUMENTS 8085 2/1980 European Pat. Off. ........... 411/55

Primary Examiner—Timothy V. Eley
Attorney, Agent, or Firm—Philip J. Lee

[57] ABSTRACT

A device for removably retaining a fluid system component in a smooth bore comprises of body on one end of which the component is mounted and the other end of which comprises a plurality of wings. The interior of the body provides female screw threads into which an expansion member is engaged, said expansion member having male screw threads at one end and at the other end a truncated conical section. Rotation of the expansion member relative to the body causes further insertion for expansion member into the body such that the conical section causes the wing members to radially expand and engage the wall of the installation bore. The device is generally cylindrical in overall configuration with an outside diameter at least slightly less than the inside diameter of the installation bore and upon retraction of the expansion member from forcible engagement with the body, the wing members relax to their original state and the device can then be readily removed from the installation bore.

21 Claims, 7 Drawing Sheets

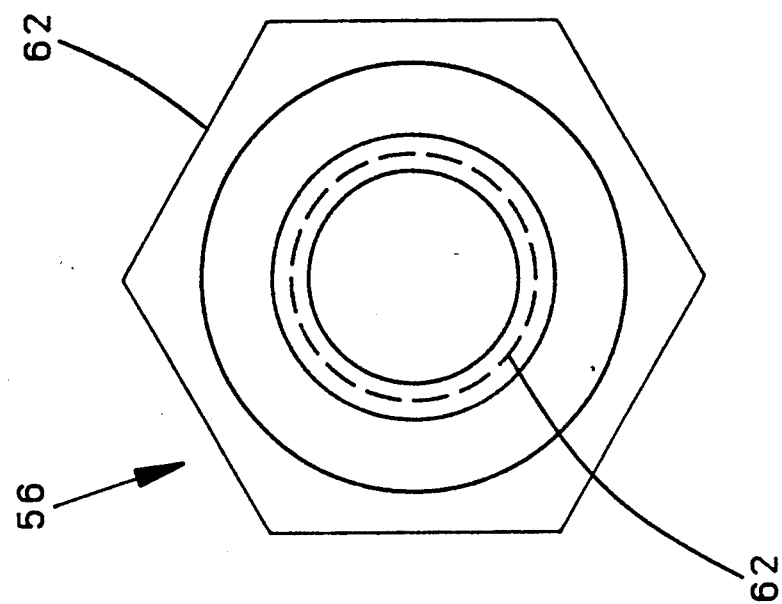
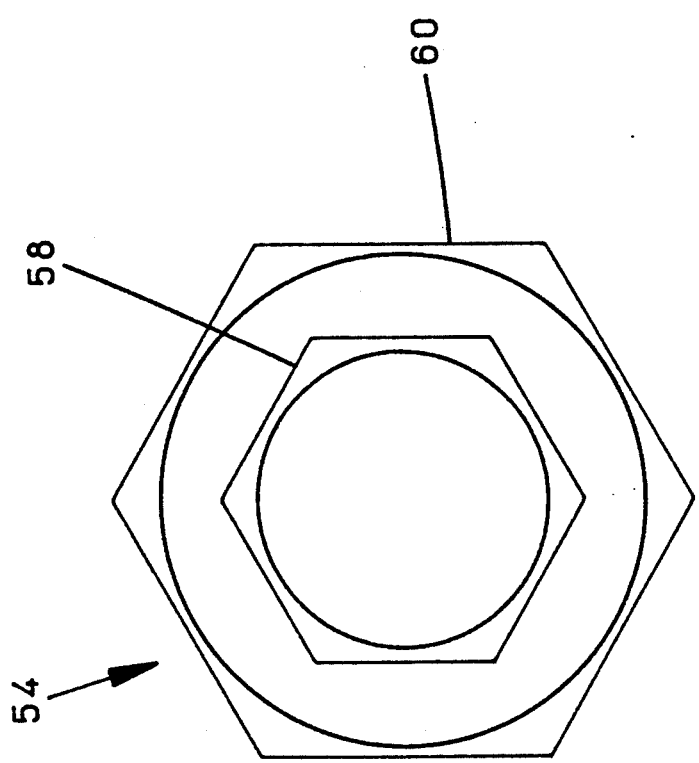
FIG. 7

DEVICE AND METHOD FOR REMOVABLY RETAINING COMPONENTS IN A SMOOTH BORE

BACKGROUND OF THE INVENTION

A. Field of Invention

The present invention relates generally to components for insertion into the bores of fluid systems and more particularly to a new and improved self-retaining, removable smooth bore insert and its method of installation and removal.

B. Description of Related art

It is frequently desireable to remove components of fluid systems to perform design changes, modifications or additions as well as routine inspection and maintenance requirements. Two (2) device designs are known for the removable retention of a miniature fluid system component inserted into a smooth bore. U.S. Pat. No. 4,753,727 to Lee, describes and claims a removable and self-retaining smooth bore insert and the method of installing the same. The referenced device utilizes a coiled helical spring with an outer diameter that is normally about 5% percent greater than the inside diameter of the installation smooth bore. The referenced device is installed by means of a tool which causes the spring to radially contract for installation and upon removal of the installation tool the coiled spring partly unwinds and radially expands to engage the wall of the installation bore to lock the insert in place. The frictional resistance provided by said device is not sufficient to allow its use where subject to bi-directional flow in systems wherein the insert is subjected to significant force from the fluid media. In applications wherein the referenced device is subject to high forces, a shoulder is used to retain the device's position in the bore, the use of which shoulder can only retain the device in one direction.

The other common device for retention of a component within a smooth bore of a fluid system is that shown but not claimed in U.S. Pat. Nos. 4,766,924 and 4,706,705 both to Lee, comprising a tapered pin and a sleeve dimensioned such that upon the tapered pin being forcefully, axially driven into the sleeve the pin forces the sleeve to controllably, radially expand to sealingly engage the wall of the fluid conduit. An axial flow passage extends through the tapered pin and the exterior surface of the sleeve is typically traversed by a plurality of circumferentially extending axially spaced grooves forming alternating lands and grooves which form individual seals with the wall of the installation bore. The referenced device provides sufficient retentive friction for use in bi-directional flow systems, but generally requires a shoulder or other means for preventing movement of the sleeve when the pin is being driven. An additional limitation of the referenced device is the difficulty of removing the device, which is caused in part by the friction between the tapered pin and the sleeve and in part by the incomplete resilience of the sleeve material which is usually a metallic substance. Before installation the original outside diameter of the sleeve is typically in close tolerance to the inside diameter of the bore. Upon installation, the radial deformation of the sleeve becomes partially permanent and upon removal of the pin, the sleeve cannot resume its original outside diameter to allow for removal. As a consequence, removal of the pin and sleeve difficult and frequently results in the destruction of the component as well as possible damage to the bore itself. This difficulty occurs even in those devices utilizing a mechanism for pulling the pin into the sleeve or pushing the pin out of the sleeve with a device attached to the sleeve such that no outside force is required.

SUMMARY OF THE INVENTION

The invention herein described is a device for removably retaining a miniature fluid system component such as a filter, stop or pressure monitor or valve within a drilled or reamed smooth bore with sufficient retentive force to allow its use in systems wherein the component is subjected to bi-directional forces.

The present invention comprises a integrally formed body and separate expansion member and, overall, presents a generally cylindrical shape. The leading end of the body is inserted first into the bore and comprises an annular portion adapted for mounting a variety of fluid system components, i.e. screen, stop, valve or other device. Three (3) equiangularly displaced wings axially extend from the annulus at the leading end of the body to form the trailing end of the body. The exterior surfaces of the trailing ends of the wings are adapted for secure engagement with the walls of the installation bore. The interior surface of the wings at the trailing end are adapted to form sections of a conical surface which tapers inward toward the leading end. Intermediate between the leading end of the body and the partial tapered bore formed by the inner surface of the wings, the wings are additionally modified on their interior surface to provide female screw threads.

The separate expansion member has a leading end, an intermediate tapered section and a trailing end adapted for the engagement of installation and removal tools. The leading end of the expansion member forms male screw threads for engaging the female screw threads formed by the body wings. The tapered section of the expansion member presents an outer surface in the shape of a truncated cone and is dimensioned such that the expansion member can be screwed partially into the body before the tapered section of the expansion member engages the inner surfaces of the trailing end of the wings and begins to force the wings to radially expand and move apart. During assembly, the expansion member is screwed into the body until a portion of the male screw threads extend past the female crew threads of the body, and a tack weld is made on the expansion member threads such that the expansion member can not become disengaged from the body.

Installation of the insert is performed by placing the insert in position and applying a clockwise torque to the expansion member by means of the installation tool. The engagement of the male and female screw threads translates the torque applied to the expansion member to axial movement of the expansion member toward the leading edge of the body. As the expansion member is moved axially toward the leading end of the body, the outside diameter of the portion of the tapered section of the expansion member that engages the inner surfaces of the wings increases to force the wings to move apart in an outwardly radial direction, thereby engaging the wall of the installation bore. Removal of the insert utilizes the opposite procedure whereby counter-clockwise torque is applied to the expansion member, causing the expansion member to withdraw from the body releasing the radially outward force on the wings which allows the wings to resume their original configuration. Since the overall outside diameter of the insert is of lesser diameter than the inside diameter of the installation bore, removal of the insert is easily performed.

A flow passage 68 is defined by the installed insert whereby the path of the fluid media axially extends through the center of the annular leading end, thence radially around the expansion member and through the spaces between the wings. The expansion member and the wings are shaped and dimensioned to provide as little resistance to flow as possible while achieving acceptable retentive capabilities.

After installation, retention of the expansion member in position within the insert and relative to the body is achieved by the friction between the screw threads as well as between the tapered section of the expansion member and the tapered inner surfaces of the wings. The angle of the taper of both the inner wing surfaces and the tapered portion of the expansion member is increased over that employed in the prior art and the resulting loss of friction between the tapered surfaces is compensated for by the additional frictional component presented by the screw threads. The increased taper angle allows proportionally greater radial expansion of the wings and allows the present invention to be used over a wider range of tolerances between the outside diameter of the insert and the inside diameter of the installation bore. The radial expansion of the wings is adjustable as a expansion member does not require full contact of the tapered surfaces, ie. full insertion of the expansion member into the body, to provide sufficient friction for the retention of the expansion member within the insert, providing usefulness over a wide range of tolerances. The wing sections are not connected to each other, other than by their common attachments to the annular leading end of the insert and accordingly are allowed to return to their original shape upon removal of the radial outward force of the tapered section of the expansion member thereby releasing the outer surfaces of the wings from engagement with the installation bore. The disengagement of the outer surface of the wings from the bore wall allows the insert to be easily removed for inspection, maintenance or other purposes without damage to the component or the bore.

The trailing end of the expansion member in the preferred embodiment presents a hexagonal outside surface and an inside surface adapted to provide female screw threads. The installation and retraction tools for use of the present invention comprise an installation wrench in the shape of a tube with one end interiorly adapted as a hexagonal socket to fittingly receive the hexagonal outside surface of the trailing end of the expansion member and the outside surface of the other end being adapted to present a hexagonal surface for the use of additional handles, wrenches or other devices for providing mechanical advantage. A retraction tool comprises a rod of outside diameter less than the inside diameter of the installation wrench designed to be slidingly received within the installation wrench. The retraction tool is adapted with male screw threads at one end for engagement with the female screw threads in the trailing end of the expansion member and the other end of the retraction tool is modified to present a hexagonal outside surface for the engagement of wrenches, handles or other devices for imposing mechanical advantage to the device.

The principal aim of the present invention is to provide a new and improved device for the removable retention of a miniature fluid system component in a smooth bore.

Other objects and advantages of the invention will become apparent from the Description of the Preferred Embodiments and the Drawings.

BRIEF DESCRIPTION OF THE DRAWINGS

In the Drawings:

FIG. 7 is a cross sectional view of the installation and retraction tools used to install and remove a fluid system insert in accordance with the present invention taken along the line A—A as shown in FIG. 6.

DESCRIPTION OF THE PREFERRED EMBODIMENT(S)

Figure 1:
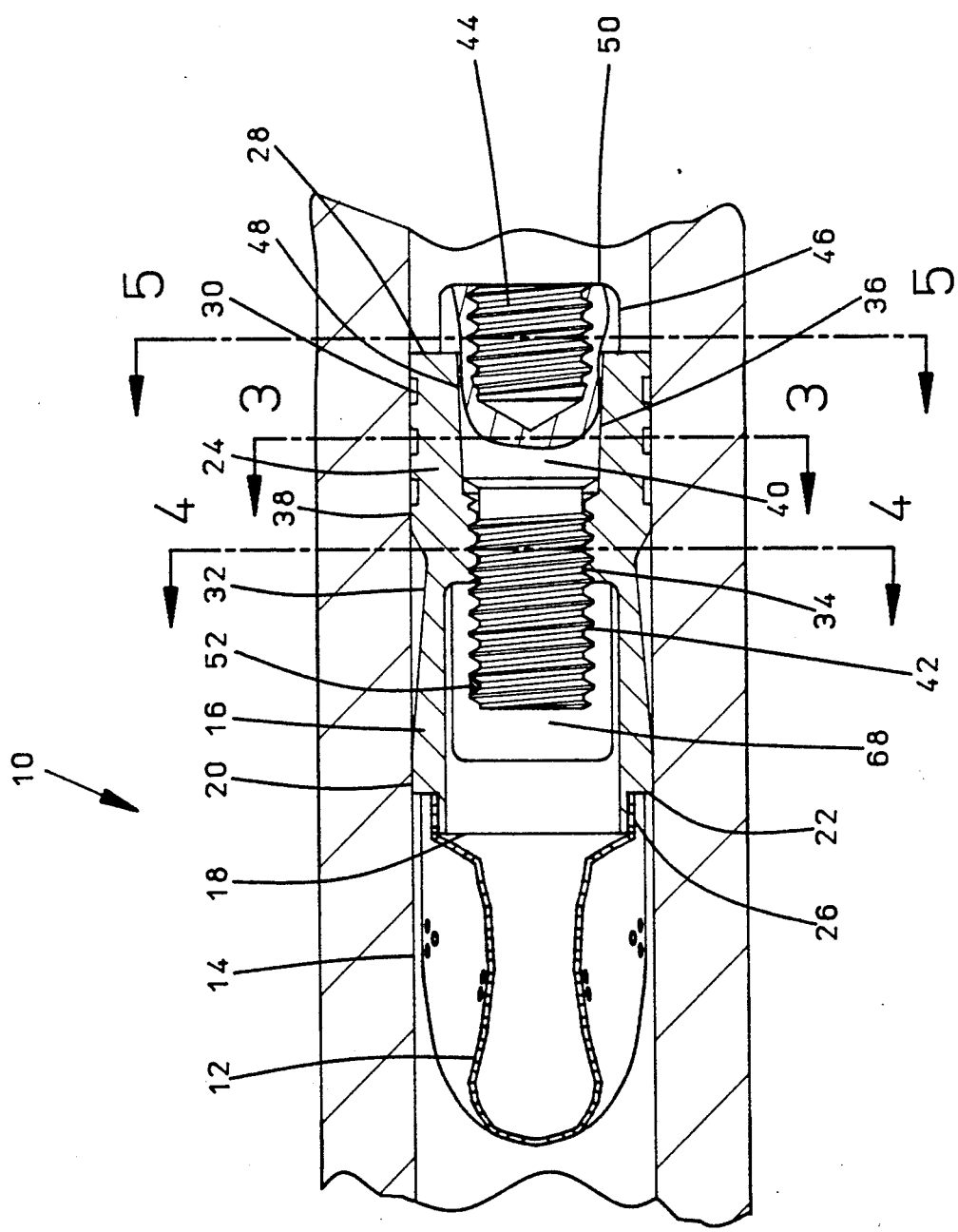
FIG. 1 is an axial sectional view of a fluid system insert in accordance with the present invention taken along the line A—A as shown in FIG. 5.
Figure 2:
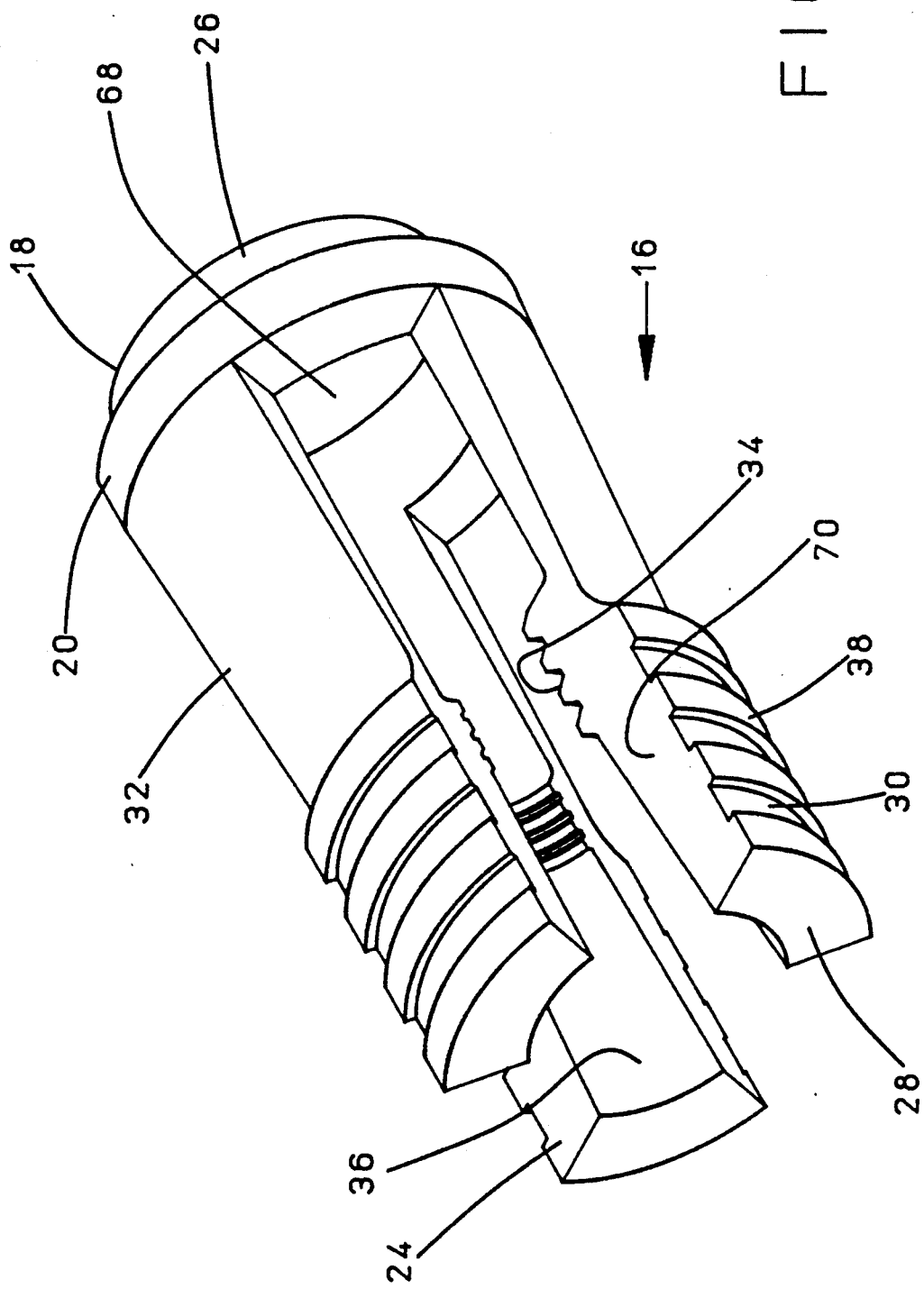
FIG. 2 is a side view of a disassembled fluid system insert in accordance with FIG. 1.

Although specific forms of the present invention have been selected for illustration in the drawings and the following description is drawn in specific terms to specifically describe the illustrated forms of the invention, the description is not intended to limit the scope of the invention which is defined in the appended claims.

Referring to the drawings wherein like numerals represent like parts throughout the figures, a self-retaining removable smooth bore fluid system insert 10 illustrates a preferred embodiment of the invention illustrating as an example of its use, the invention's employment for mounting a filter 12 within a bore 14 of a conventional hydraulic or other fluid system conduit. The insert 10 can alternatively be adapted to mount a variety of fluid system components including but not limited to, check valves, pressure regulation devices, pressure relief valves, or other devices suitable for installation into the bore of a fluid system.

The filter 12 shown in the Drawings comprises a folded filter screen designed in accordance with the U.S. Pat. No. 4,699,715. The features and characteristics of which are described in said patent and incorporated herein by this reference.

Insert 10 is of an overall general cylindrical configuration with an outside diameter at its greatest approximately equal to but slightly less than the inside diameter of the installation bore 14. Insert 10 comprises a body 16 and a separate expansion member 40. A leading end 18 of the insert body 16 is adapted to form an annular mounting base for screen 12 by providing a stepped concentric form defining a circumferentially transverse shoulder 22 and a cylindrical exterior mounting surface 26 of reduced outside diameter. In the illustrated preferred embodiment, the screen 12 is braised to the mounting surface 26; however it is anticipated that alternative configurations of the present invention may utilize other means of attachment such as screw threads or other common means. The radially outer surface 20 of the body 16 immediately proximate to the shoulder 22 and on the side of the shoulder toward the trailing end 28 is cylindrical and has an outside diameter slightly less than the inside diameter of the installation bore 14. Three (3) wing members 24 axially extend from the leading end 18 toward the trailing end 28 of the insert body 16. The wing members 24 are each the same shape and are equally dimensioned and equiangularly displaced about the longitudinal axis of the insert 10. Proximate to the trailing end of the insert body 16, the exterior surfaces of the wing members 24 form bore engaging surfaces 38 that are curved to conform to the curvature of the installation bore 14. The bore engaging surfaces 38 have radii slightly less than the radius of the installation bore 14. Axially spaced and circumferentially extending grooves 30 traverse the bore engaging surface 38 to form alternating axially spaced lands and grooves. Between the leading end 18 and the bore engaging surface 38, the radius of the intermediate outside surface 32 of each wing 24 is reduced. By reducing the radius of the outside surface 32, the radial thickness of the wings 24 is reduced to allow flexibility and resiliency thereby allowing the insert 10 to conform to a range of installation bore diameters. At an axially intermediate position, the interior surface of the wings 24 protrudes radially inwardly and forms sections of female screw threads 34. The inner surfaces 36 of the wings 24 from the female screw threads 34 to the trailing end 28 form sections of a tapered bore of steadily increasing radius toward the trailing end 28.

The insert 10 further comprises a separate expansion member 40 having a leading screw end 42, an intermediate tapered section 48 and an trailing end 50 adapted for engagement of installation and removal tools. The screw end 42 forms male threads for threading engagement with the female threads 34 of the wings 24 such that upon rotation of the expansion member 40 relative to the body 16, the expansion member 40 moves in an axial direction relative to the body 16 and is either further inserted or further withdrawn from the body 16 depending upon the direction of rotation. The axial movement of the expansion member 40 toward the leading end 18 of the insert body 16 is caused by the clockwise rotation of the expansion member 40. A counterclockwise rotation of the expansion member 40 causes the expansion member 40 to withdraw from the body 16. The tapered section 48 of the expansion member 40 is formed in the shape of a truncated cone with approximately the same degree of taper as the tapered inner surfaces 36 of the wings 24. The tapered section 48 of the expansion member 40 and the tapered inner surfaces 36 of the wings 24 are so dimensioned that axial movement of the expansion member 40 toward the leading end 18 of the insert body 16 causes the engagement of the tapered section 48 with the tapered inner surfaces 36 of the wings 24.

As the expansion member 40 is moved axially toward the leading end 18 of the body 16, the outside diameter of the portion of the tapered section 48 of the expansion member 40 that engages the inner surfaces 36 of the wings 24 increases, forcing the wings 24 to move apart in a radially outward direction. The wings are thus controllably radially expanded to force the installation bore engaging surfaces 38 of the wings 24 to engage the surrounding wall of the installation bore 14. Removal of the insert 10 utilizes the opposite procedure whereby counter-clockwise torque is applied to the expansion member 40, causing the expansion member 40 to withdraw from the body 16 thereby releasing the radially outward force on the wings 24 which allows the wings 24 to resume their original configuration and radii which are less than that of the installation bore 14.

Figure 3:
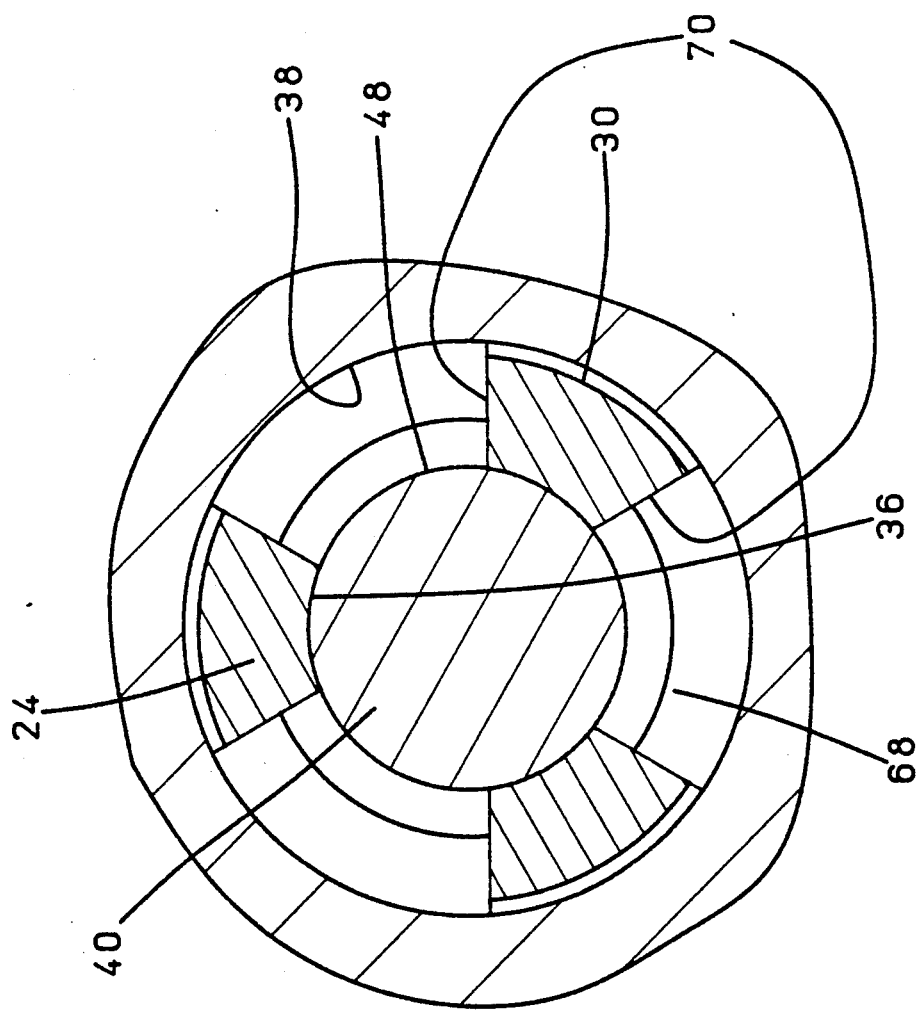
FIG. 3 is a cross sectional view of the fluid system insert in accordance with the present invention taken along the line B—B as shown in FIG. 1.
Figure 4:
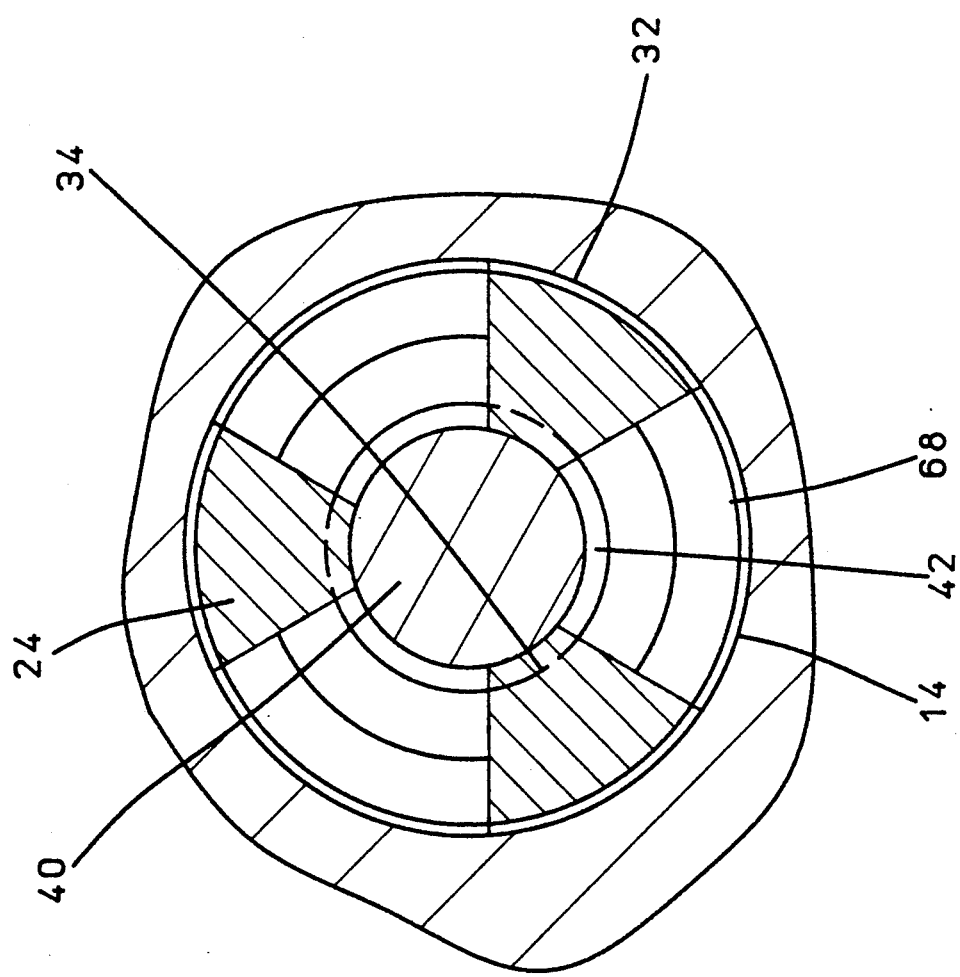
FIG. 4 is a cross sectional view of a fluid system insert in accordance with the present invention taken along the line C—C as shown in FIG. 1.
Figure 5:
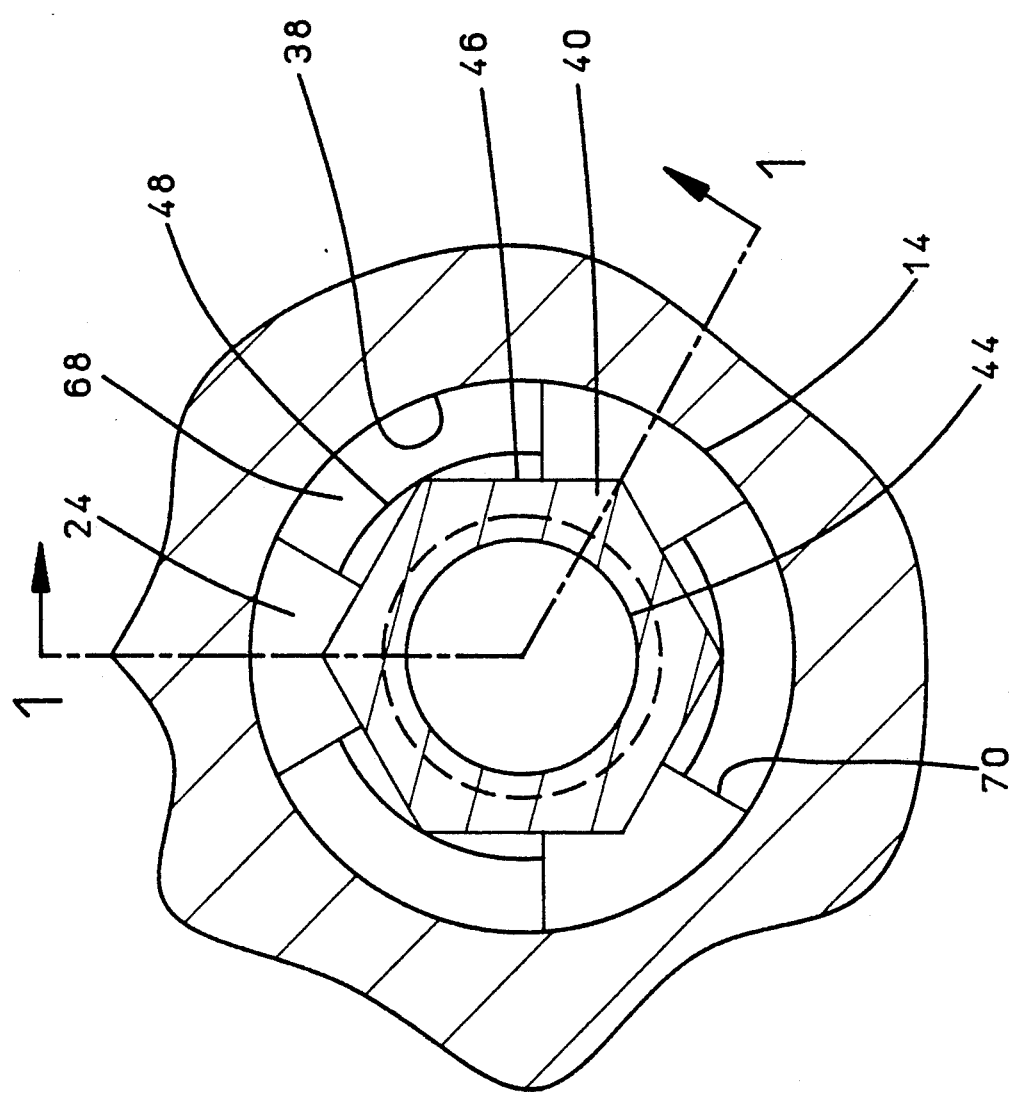
FIG. 5 is a cross sectional view of a fluid system insert in accordance with the present invention taken along the line D—D as shown in FIG. 1.
Figure 6:
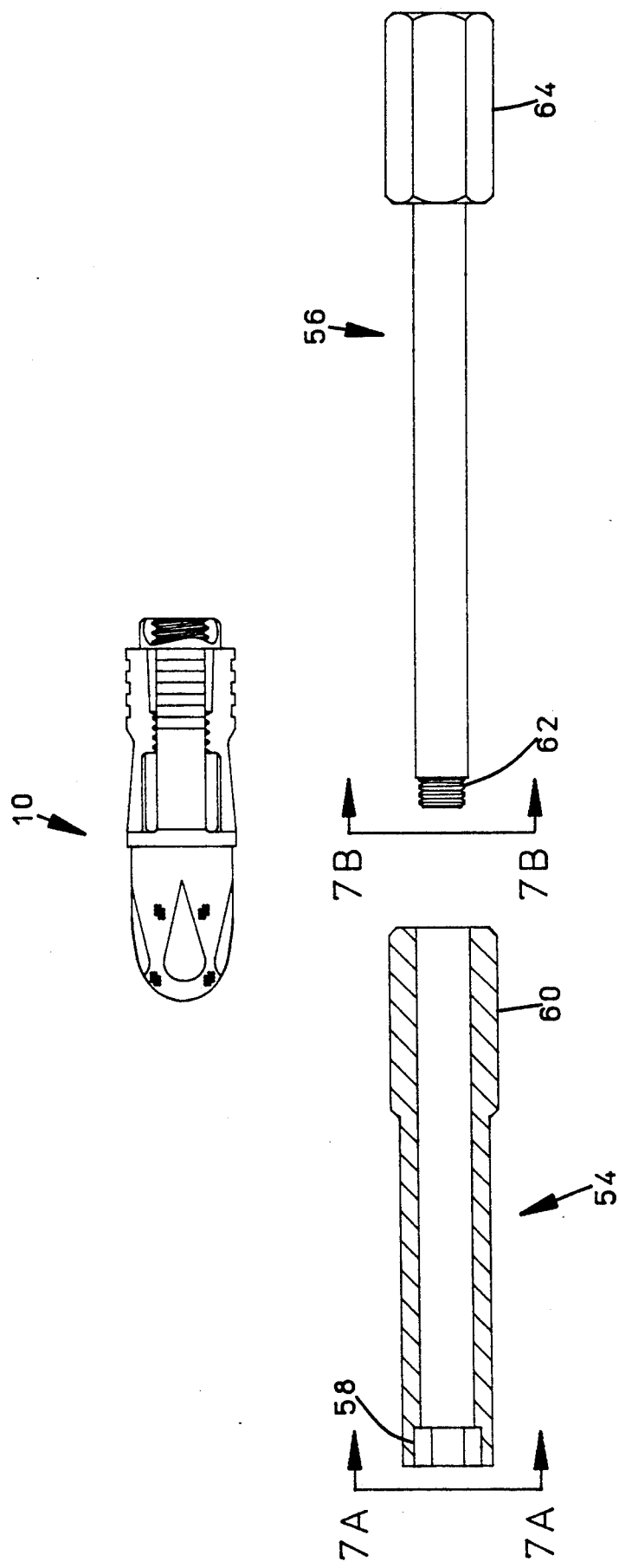
FIG. 6 is an axial sectional view of the installation and retraction tools used to install and remove a fluid system insert in accordance with the present invention into or from a bore.

As illustrated in FIGS. 3, 4 and 5, in the preferred embodiment, each wing 24 possesses longitudinal bilateral symmetry across a plane on which both the axis and the radius that intersects the mid point of the arc of the outer surfaces of wings 24 lie. Each edge 70 of each wing 24, when viewed in cross section in accordance with FIGS. 3, 4, or 5, presents a positive angle of attack with respect to the radially outer surfaces of tapered section 48 and the screw end 42 of the expansion member 40, such that an angle of at least 180 degrees is included by the plane of edge 70 and the radius that intersects the intersection of the edge 70 and the inner surface of the wing 24. Said positive angle of attack is required at least through the portion engaging the tapered section 48 of the expansion member 40 to prevent scoring, chafing and galling of the tapered section of the expansion member upon installation and removal.

An axially extending flow passage 68 is defined by the installed insert 10 whereby the fluid media flows through the orifices in screen 12, thence through the center of the annular leading end 18 of the body 16, thence radially around the expansion member 40 and through the spaces between the wings 24. The flow path thus defined is bidirectional and flow is equally allowed in the opposite direction. To minimize the restriction of flow through the insert 10 the cross sectional area of the wings 24 is less than the cross sectional area of the spaces between the wings 24. For the same reason, the expansion member 40 does not extend into the central orifice defined by the leading end 18 and is limited in radial dimensions to avoid blocking or restricting the flow passage 68. An additional advantage of the angled edges 70 is to allow a greater flow passage 68 between the wings 24 without reducing the area of the bore engaging surface 38.

During assembly of the illustrated preferred embodiment, the expansion member 40 is screwed into the body 16 until a portion of the male screw threads extend past the female screw threads 34 of the body, and a tack weld 52 is made on the male screw thread end 42 such that the expansion member 40 can not become disengaged from the body 16.

The trailing end 50 of the expansion member 40 in the preferred embodiment presents a hexagonal outside surface 46 and an inside surface adapted to provide female screw threads 44.

Installation of the insert 10 is performed by placing the insert 10 in position and applying a clockwise torque to the expansion member 40 by means of an installation wrench 54. The installation wrench 54 is generally tubular and at one end is formed such that the interior surface is hexagonal and comprises a hexagonal socket 58 and the other end is formed such that the exterior surface is hexagonal. The hexagonal socket 58 is dimensioned to closely receive the hexagonal surface 46 of the trailing end 50 of the expansion member 40 and the exteriorly hexagonal end 60 of installation wrench 54 serves as a means for engaging a handle or other device (not shown) for obtaining a mechanical advantage. The engagement of the male and female screw threads, 42 and 34, translates the torque applied to the expansion member 40 to axial movement of the expansion member 40 toward the leading edge 18 of the body 16. As the expansion member 40 is moved axially toward the leading end 8 of the body 16, the outside diameter of the portion of the tapered section 48 of the expansion member 40 that engages the inner surfaces 36 of the wings 24 increases to force the wings 24 to move apart in an outwardly radial direction, thereby engaging the wall of the installation bore 14. Within limits imposed by the strength of the materials used, the amount of torque to be applied depends upon the size of the insert 10 and the retentive capability desired. For example, in a insert 10 having an outside diameter of 0.245 inches, a torque of 10 inch-pounds will result in the capability of retaining the insert 10 against a pressure differential of about 2,000 pounds per square inch, while in a insert 10 having an outside diameter of 0.187 inches, the same torque of 10 inch-pounds will result in retentive capability sufficient to retain the insert 10 against a pressure differential of about 5,000 pounds per square inch.

Removal of the insert 40 utilizes the opposite procedure whereby a counter-clockwise torque is applied to the expansion member 40, causing the expansion member 40 to withdraw from the body 16 releasing the radially outward force on the wings 24 which allows the wings 24 to resume their original configuration. A retraction tool 56 comprises a rod of outside diameter less than the inside diameter of the installation wrench 54 and is slidingly received within the installation wrench 54. The retraction tool 56 is adapted with male screw threads 62 at one end for engagement with the female screw threads 44 in the trailing end 50 of the expansion member 40 and the other end of the retraction tool 56 is modified to present a hexagonal exterior for the engagement of wrenches, handles or other devices (not shown) for obtaining mechanical advantage. The retraction tool 56 is threadingly engaged with the expansion member 40 before the insert 10 is loosened in the installation bore 14 to prevent lose of the insert 10 within the fluid system.

It will be appreciated that the expansion member 40 is retained within the body 16 by means of friction and accordingly not all materials are suitable. In the preferred embodiment illustrated in the drawings the angle of expansion of the tapered section of the expansion member and the tapered inner surface of the wings is approximately 4.76° included angle. Accordingly, the materials must be selected such that the static coefficient of friction between the two materials is in excess 0.04. Except in lubricated conditions, this coefficient of friction is generally not approached except by substances such as Teflon (registered trademark E. I. du Pont de NeMours and Company, Wilmington, Del.) or similar substances which generally lack the structural and mechanical characteristics required in the present invention. Accordingly, sufficient friction results from most otherwise suitable materials provided the surfaces are not lubricated or are at least not completely lubricated enough to reduce the static coefficient of friction to below 0.04. It should be appreciated that the requisite coefficient of friction is reduced as the angle of the taper is reduced and that reduction of the taper angle reduces the amount of radial expansion of the wings 24. Therefore, in applications where the tolerance between the inside diameter of the installation bore 14 and the outside diameter of the insert 10 is sufficiently close to allow reduction of the angle of taper, materials with a lower coefficient of friction may be used.

It will further be appreciated that since the expansion member surfaces are not lubricated and the installation and removal of the insert 10 can readily produce high contract stresses between the sliding surfaces of the tapered section 48 of the expansion member 40 and the tapered inner surfaces 36 of the wings 24, with some materials galling of the surfaces will occur thereby preventing the reusability of the insert 10. Further limitations of suitable materials in the preferred embodiment arise as a result of the fact that the screen 12 is braised to the body 16 and in that process the heat treating and final hardness of the wings 24 is effected, and the desirability of corrosion resistance, tensile strength, and resilience characteristics in the materials of the body 16 and the expansion member 40. In the present invention the surfaces are milled smooth and the selection of alloys is the main means for controlling surface galling. In the illustrated preferred embodiment the body 16 is formed of an alloy recognized by the American Iron and Steel Institute as Type 416 Stainless steel, a martensitic stainless steel designated as Unified Numbering System number S41600 containing the following elements in addition to iron: Carbon: 0.15%, Manganese: 1.25%, Silicon: 1.00%, Chromium: 12.0–14.0%, Phosphorus: 0.04%, Sulfur: 0.03% and optionally, Molybdenum: 0.6%, and having a Rockwell hardness of C-37 after tempering. In the illustrated preferred embodiment the expansion member 40 is formed of an alloy recognized by the American Iron and Steel Institute as Type 420 Stainless steel, a martensitic stainless steel designated as Unified Numbering System number S42000 containing the following elements in addition to iron: Carbon: 0.15%(minimum), Manganese: 1.00%, Silicon: 1.00%, Chromium: 12.0–14.0%, Phosphorus: 0.04%, Sulfur: 0.03%, and having a Rockwell hardness of C-51 after tempering. It is anticipated that other materials of equivalent characteristics can be used. Generally a difference in hardness between the expansion member 40 and the body 16 of Rockwell C-7 or more appears to minimize surface galling. In applications wherein the hydraulic component is not braised to the body 16, the body 16 can be drawn from a larger group including 18—18 PLUS (Registered Trademark Carpenter Technology Corporation, Reading, Pa.), PROJECT 70 (Registered Trademark Carpenter Technology Corporation, Reading, Pa.) Type 303, being an austenitic stainless steel produced by Carpenter Technology Company, and Type 420 as described above. In addition, it is further anticipated that other suitable materials may be found to perform equally well and that a wider range of suitable materials is available in applications wherein surface galling is tolerable.

It will be further appreciated that the present invention can be formed with two wings 24, in which configuration a higher flow capacity is possible but the ability of the insert to retain a component is compromised. In addition, it should be appreciated that the insert 10 is a relatively compact device which in the illustrated preferred embodiment has an axial length on the order of 0.85 inches and an outside diameter in the order of 0.245 inches. While the insert was generally designed for miniature applications, it is anticipated that the insert 10 would function over a wide range of sizes. Inclusion of a different screen assembly or other components will modify the dimensions accordingly.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. The method of removably retaining a component in an installation bore comprising
    A. attaching a component to a device comprising an expansion means and body means that comprises a plurality of axially extending bore engaging means each having female screw threads, interior surfaces that are conically curved and axially tapered and exterior surfaces that are cylindrically curved, wherein the expansion means comprises a section formed with male screw threads engageable with the female screw threads of the bore engaging means and a conical, tapered section coaxial with and of slightly greater average diameter than the curved interior section of the bore engaging means, wherein the expansion means is adapted to engage a means for applying rotational torque and to engage a means for retaining and removing said device from the installation bore,
    B. inserting the removal means into the torque means,
    C. engaging the removal means with the expansion means,
    D. inserting the device into the installation bore,
    E. engaging the expansion means with the torque means,
    F. applying clockwise rotational torque to the torque means,
    G. disengaging the removal means of and the torque means from the expansion means, and
    H. removing the removal means and the torque means from the installation bore.

2. The method of claim 1 wherein the amount of torque applied to the torque means is at least about 10 inch-pounds.

3. The method of removing a component from an installation bore in which it is installed wherein the component has been attached to a device comprising an expansion means and body means that comprises a plurality of axially extending bore engaging means each having female screw threads, wherein the expansion means comprises a first end formed with male screw threads engageable with the female screw threads of the bore engaging means and a second end adapted to engage a means for applying rotational torque to the expansion means and to engage a means for removing said device from the installation bore, said method comprising
    A. inserting the removal means into the torque means,
    B. engaging the removal means with the expansion means,
    C. engaging the expansion means with the torque means,
    D. applying counter-clockwise rotational torque to the torque means,
    E. removing the device, removal means and torque means from the installation bore, and
    F. disengaging the removal means and the torque means from the expansion means.

4. A device for removably retaining components within a bore comprising
    A. body means defining a central orifice and comprising a plurality of axially extending bore engaging means, each of which bore engaging means comprises a cylindrically curved bore engaging exterior surface, a conically curved and axially tapered interior surface and a section of female screw threads; and
    expansion means for radially outwardly displacing the bore engaging means comprising male screw threads that engage the female screw thread sections of the bore engaging means and a conical tapered section coaxial with, and having an average radius greater than, the curved interior surface of the bore engaging means and positioned such that rotation of the expansion means, in relation to the bore engaging means, axially drives the tapered section of the expansion means into or out of engagement with the curved interior surface of the bore engaging means such that the bore engaging means are radially displaced to releasably engage an installation bore and an axially extending flow passage is defined through the installed device through the central orifice, radially around the expansion means and between the bore engaging means.

5. The device of claim 4 wherein the bore engaging means are equiangularly displaced about the axis of the device.

6. The device of claim 5 wherein the body means comprises at least three bore engaging means.

7. The device of claim 6 wherein the bore engaging surfaces of the bore engaging means have a plurality of circumferentially extending, alternating axially spaced lands and grooves.

8. The device of claim 7 wherein the body means further comprises means for attaching a hydraulic component.

9. The device of claim 8 wherein the expansion means is adapted to engage a means for applying rotational torque and a means for retaining and removing said device from the installation bore.

10. The device of claim 9 wherein the bore engaging means further comprise sides extending from the exterior surface to the interior surface and for each side, the angle between the intersecting surfaces of the side and the adjacent interior surface, as defined by the tangent to the curve of the interior surface that intersects the intersection of the side and the interior surface of the bore engaging means is not less than 90 degrees.

11. The device of claim 10 wherein the bore engaging means further comprise intermediate sections of reduced thickness.

12. The device of claim 11 wherein the cross sectional area of the bore engaging means is less than one half of the cross sectional area of the flow passage between the bore engaging means and radially outside of the expansion means of the device when installed.

13. The device of claim 12 wherein the surfaces whereby the bore engaging means are in contact with the expansion means are formed of substances having a coefficient of friction greater than 0.04.

14. The device of claim 13 wherein the surfaces whereby the bore engaging means are in contact with the expansion means are formed of substances having non-galling properties.

15. The device of claim 14 wherein the surfaces whereby the bore engaging means are in contact with the expansion means are formed of substances having a difference in hardness from that of the expansion means of about at least Rockwell C-7.

16. The device of claim 12 wherein the bore engaging means and the expansion means are formed of substances having a coefficient of friction greater than 0.04.

17. The device of claim 16 wherein the bore engaging means and the expansion means are formed of substances having non-galling properties.

18. The device of claim 17 wherein the bore engaging means are formed of a martensitic stainless steel containing the following elements in addition to iron: Carbon: 0.15%, Manganese: 1.25%, Silicon: 1.00%, Chromium: 12.0–14.0%, Phosphorus: 0.04%, Sulfur: 0.03% and optionally, Molybdenum: 0.6%, and having a Rockwell hardness of C-37 and the expansion means are formed of a martensitic stainless steel designated as Unified Numbering System number S42000 containing the following elements in addition to iron: Carbon: at least 0.15%, Manganese: 1.00%, Silicon: 1.00%, Chromium: 12.0–14.0%, Phosphorus: 0.04%, Sulfur: 0.03%, and having a Rockwell hardness of C-51.

19. The device of claim 12 further comprising at least one of the following, a screen valve, pressure regulation device, directional flow control device or pressure monitor attached to the body means.

20. The device of claim 19 further comprising means for applying rotational torque and a female screw threaded inner surface for threadingly engaging means for retaining and removing said device from the installation bore wherein the torque means comprising an elongated tube adapted to form a hexagonal socket, and means for retaining and removing said device from the installation bore comprising a rod slidingly received within the torque means and adapted with male screw threads, and wherein the expansion means further comprises a hexagonal outer surface for engaging the torque means and female screw threads for threadingly engaging the removal means.

21. The device of claim 20 wherein the angle of taper of the tapered section of the expansion means is about 4–5 degrees included angle.

* * * * *